United States Patent
Sasaki

(10) Patent No.: US 9,710,913 B2
(45) Date of Patent: Jul. 18, 2017

(54) IMAGE PROCESSING APPARATUS THAT FORMS DISTANCE IMAGE AND CONTROL METHOD THEREOF, AS WELL AS STORAGE MEDIUM

(71) Applicant: CANON KABUSHIKI KAISHA, Tokyo (JP)

(72) Inventor: Takashi Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/683,531

(22) Filed: Apr. 10, 2015

(65) Prior Publication Data

US 2015/0302589 A1  Oct. 22, 2015

(30) Foreign Application Priority Data

Apr. 18, 2014  (JP) ................... 2014-086318

(51) Int. Cl.
*G06T 7/00*   (2017.01)
*G06T 7/571*  (2017.01)
*G06T 7/593*  (2017.01)

(52) U.S. Cl.
CPC ............ *G06T 7/0069* (2013.01); *G06T 7/571* (2017.01); *G06T 7/593* (2017.01); *G06T 2207/10012* (2013.01)

(58) Field of Classification Search
None
See application file for complete search history.

(56) References Cited

U.S. PATENT DOCUMENTS

| 4,667,228 | A | 5/1987 | Kawamura et al. |
| 6,100,929 | A | 8/2000 | Ikeda et al. |
| 6,438,566 | B1 | 8/2002 | Okuno et al. |
| 8,947,523 | B2 | 2/2015 | Matsui |
| 2002/0154240 | A1* | 10/2002 | Tamai ............ H04N 5/232 348/345 |
| 2010/0128163 | A1* | 5/2010 | Nagasaka ........ H04N 5/2356 348/348 |
| 2011/0279699 | A1 | 11/2011 | Matsui |

(Continued)

FOREIGN PATENT DOCUMENTS

| JP | 2001-208524 | 8/2001 |
| JP | 2008-015754 | 1/2008 |

(Continued)

*Primary Examiner* — Delomia L Gilliard
(74) *Attorney, Agent, or Firm* — Fitzpatrick, Cella, Harper & Scinto

(57) ABSTRACT

An image processing apparatus capable of correcting an error during computation of a correlation degree without storing data for correcting distance information in advance in a recording medium, to highly accurately form a distance image. The image processing apparatus has a distance estimation unit that estimates a subject distance in each area, from a correlation degree of a plurality of images, a distance reliability calculation unit that calculates the reliability of the subject distance estimated by the distance estimation unit, and a distance image forming unit that corrects the subject distance estimated by the distance estimation unit based on the reliability calculated by the distance reliability calculation unit and to form a distance image based on the corrected subject distance.

26 Claims, 8 Drawing Sheets

(56) References Cited

U.S. PATENT DOCUMENTS

2012/0249816 A1* 10/2012 Li ................... H04N 5/23212
348/220.1
2013/0027587 A1   1/2013 Matsui et al.
2013/0121537 A1* 5/2013 Monobe ............ H04N 5/23254
382/106

FOREIGN PATENT DOCUMENTS

| JP | 4403477 | 1/2010 |
| JP | 2012-003233 | 1/2012 |
| JP | 2013-030895 | 2/2013 |

* cited by examiner

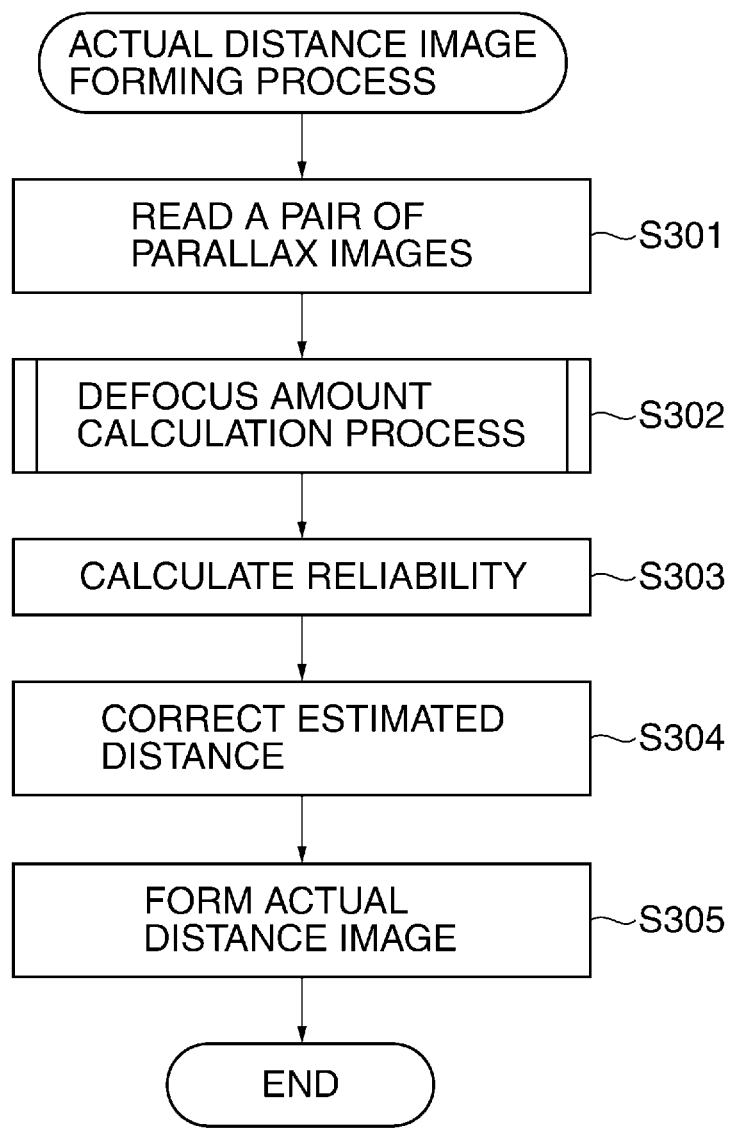

IMAGE PROCESSING APPARATUS THAT FORMS DISTANCE IMAGE AND CONTROL METHOD THEREOF, AS WELL AS STORAGE MEDIUM

BACKGROUND OF THE INVENTION

Field of the Invention

The present invention relates to an image processing apparatus that forms a distance image indicating the distance to a subject from a plurality of images, and a control method thereof, as well as a storage medium.

Description of the Related Art

In the field of computer vision or the like, there is a demand for obtaining accurate distance information of a subject from a shot image.

For example, Japanese Laid-Open Patent Publication (Kokai) No. 2012-3233 discloses a technique of changing, according to the image height, a value of a Gaussian filter in a convolution operation performed to calculate distance information, in order to accurately estimate the distance by reducing the estimated distance error caused by a change in a blur function associated with a change in the image height.

Japanese Laid-Open Patent Publication (Kokai) No. 2013-30895 discloses a technique of reducing an error of distance information associated with a deviation of blur caused by image surface curvature, wherein defocus information as already-known information is used to correct the error.

However, in the related art above, the Gaussian filter or the defocus information used for the correction needs to be held in advance in a recording medium, such as a ROM, to correct the distance information.

In the related art above, a correlation degree of a plurality of images with different focusing positions is computed to form an image in which distance information is calculated for each pixel of an input image (hereinafter referred to as "the distance image"). However, correction of an error during the computation of the degree of correlation is not mentioned.

SUMMARY OF THE INVENTION

The present invention provides an image processing apparatus which is capable of correcting an error during computation of a correlation degree without storing data for correcting distance information in advance in a recording medium, to highly accurately form a distance image, and a control method thereof, as well as a storage medium.

In one aspect of the invention, there is provided an image processing apparatus comprising: a distance estimation unit configured to estimate a subject distance in each area, from a correlation degree of a plurality of images; a distance reliability calculation unit configured to calculate the reliability of the subject distance estimated by the distance estimation unit; and a distance image forming unit configured to correct the subject distance estimated by the distance estimation unit based on the reliability calculated by the distance reliability calculation unit and to form a distance image based on the corrected subject distance.

According to the present invention, it is possible to correct an error during computation of a correlation degree without storing data for correcting distance information in advance in a recording medium, to highly accurately form a distance image.

Further features of the present invention will become apparent from the following description of exemplary embodiments with reference to the attached drawings.

BRIEF DESCRIPTION OF THE DRAWINGS

FIG. 3A is a flowchart showing the procedure of an actual distance image formation process executed by the distance image forming apparatus of FIG. 1.

DESCRIPTION OF THE EMBODIMENTS

An embodiment of the present invention will now be described in detail with reference to the attached drawings.

In the embodiment of the present invention, a correlation computation, such as SAD, is performed to estimate a defocus amount of a plurality of input images, specifically, a pair of images with parallax in a stereo direction acquired for the same subject or a pair of images with different focusing positions. In this case, whether there is an error during the correlation computation, specifically, whether a defocus amount exceeding infinity is calculated, is determined to calculate a defocus amount with a reduced error based on the result of the determination.

The reliability of the calculated defocus amount is calculated, and the calculated reliability is used to correct the defocus amount to form a distance image from the corrected defocus amount. In this way, data for correcting distance information is not stored in advance in a recording medium, such as a ROM, and an error during the computation of the correlation degree can be corrected to form a highly accurate distance image.

Figure 1:
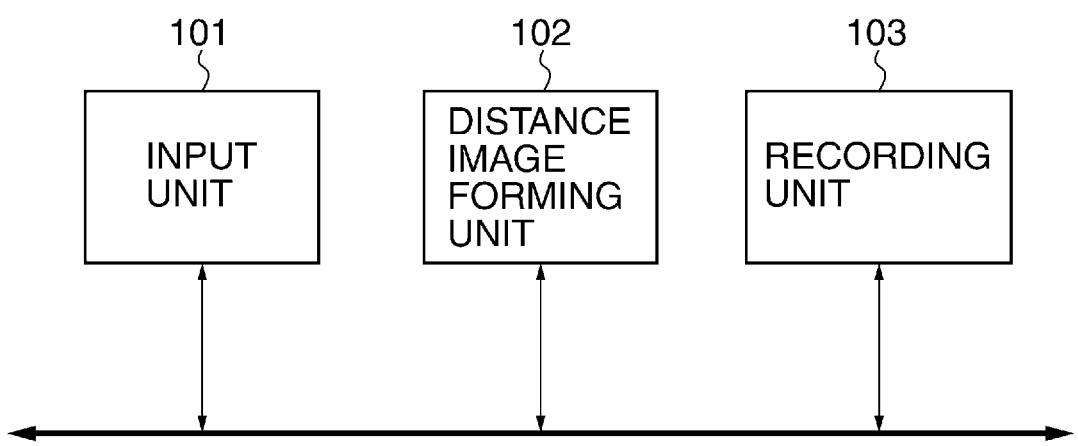
FIG. 1 is a block diagram showing a configuration of a distance image forming apparatus as an image processing apparatus according to an embodiment of the present invention.

FIG. 1 is a block diagram showing an example of a configuration of a distance image forming apparatus as an image processing apparatus according to the embodiment of the present invention.

The distance image forming apparatus of FIG. 1 includes an input unit 101, a distance image forming unit 102, and a recording unit 103 connected to one another through a bus.

The input unit 101 has image data input thereto. In an image pickup apparatus such as a digital camera, the input unit 101 is equivalent to an image pickup unit that picks up an image of a subject. The image pickup unit includes image pickup elements, such as an optical lens, a CCD sensor, and a CMOS sensor, a signal processing circuit, and the like. The distance image forming unit 102 uses the image data input to the input unit 101 to generate a distance image. The details of the distance image forming unit 102 will be described later. The recording unit 103 stores the input image data and records the formed distance image. The recording unit 103 includes a hard disk, a CD-ROM, a CD-R, a memory card, or the like and can also store processing programs and other data.

Figure 2:
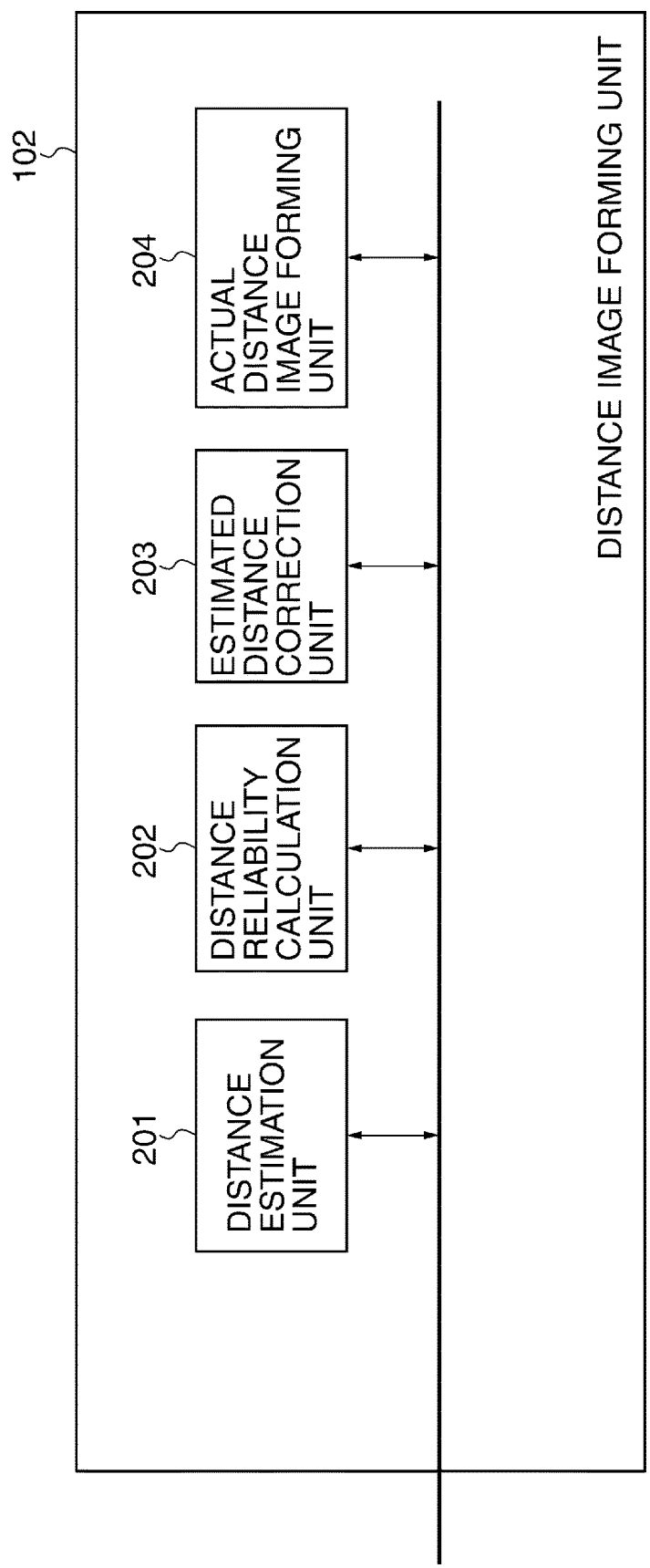
FIG. 2 is a block diagram showing a configuration of the distance image forming unit in FIG. 1.

FIG. 2 is a block diagram showing a configuration of the distance image forming unit 102 in FIG. 1.

The distance image forming unit 102 of FIG. 2 includes a distance estimation unit 201, a distance reliability calculation unit 202, an estimated distance correction unit 203, and an actual distance image forming unit 204 connected to one another through a bus.

The distance estimation unit 201 estimates the distance of each subject included in images, from a plurality of images input to the input unit 101. The present embodiment adopts an example of a method of acquiring a pair of images with horizontal parallax with respect to the same subject to estimate the subject distance. A correlation degree computation process can be applied to the pair of images with horizontal parallax to detect an image deviation amount. The details of the detection method of the image deviation amount will be described later. It should be noted that the direction of the pair of images with parallax is not limited to the horizontal direction, but may be any direction such as a vertical direction.

The distance estimation unit 201 multiplies the image deviation amount by a predetermined conversion factor to calculate a deviation (defocus amount) on imaging surfaces of the images. It should be noted that the calculation method of the defocus amount is not particularly limited, and for example, a DFD (Depth from Defocus) method using a focus image and a defocus image, which is a well-known technique (such as Japanese Patent No. 4403477), can be applied.

The distance reliability calculation unit 202 generates a reliability indicating how much the defocus amount (hereinafter referred to as "the estimated distance") calculated by the distance estimation unit 201 can be relied. The reliability here is an index calculated by comparing the calculated estimated distance and the defocus amount of infinity. The details of the calculation method of the reliability will be described later.

The estimated distance correction unit 203 corrects the estimated distance based on the reliability calculated by the distance reliability calculation unit 202. The details of the correction method of the estimated distance will be described later. The actual distance image forming unit 204 converts the corrected estimated distance corrected by the estimated distance correction unit 203 into a subject distance through the lens.

FIG. 3A is a flowchart showing the procedure of an actual distance image forming process executed by the distance image forming apparatus of FIG. 1.

The processes in FIG. 3A is executed by a CPU or the like (not shown) using a control program stored in the recording unit 103 or the like developed to a RAM (not shown) of the distance image forming apparatus of FIG. 1.

In FIG. 3A, the distance image forming apparatus of FIG. 1 reads a pair of images with horizontal parallax with respect to the same subject through the input unit 101 in step S301, followed by the program proceeding to step S302.

Figure 4A:
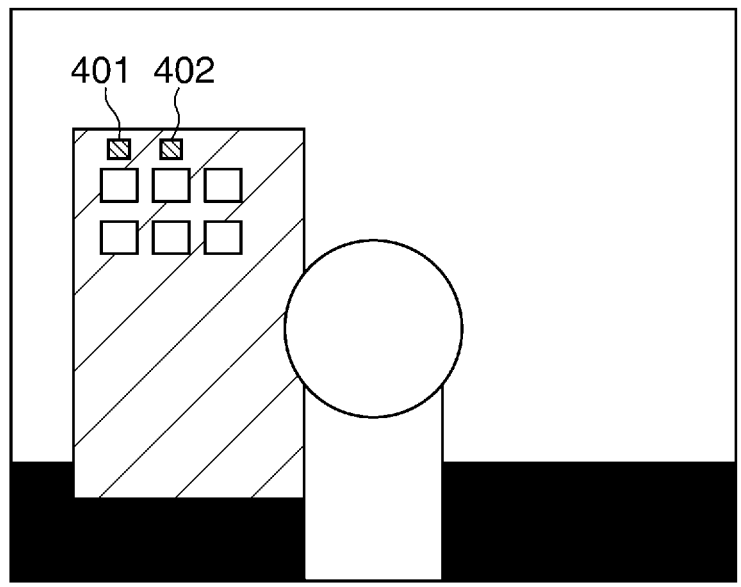
FIGS. 4A and 4B each are diagrams showing an example of a pair of images with horizontal parallax read through an input unit.
Figure 4B:
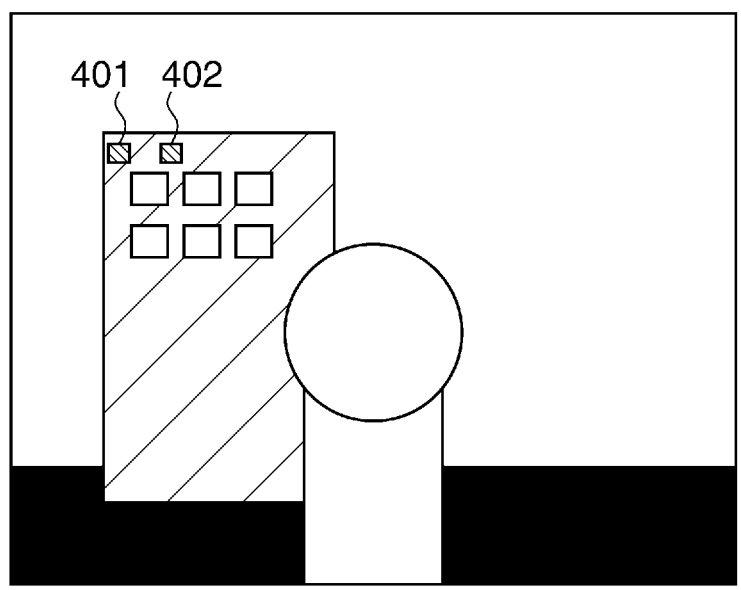

FIGS. 4A and 4B each are diagrams showing an example of the pair of images with horizontal parallax read through the input unit in FIG. 1.

Hereinafter, the pair of images with horizontal parallax read through the input unit will be referred to as "the parallax images".

In the pair of parallax images, a person as a focused subject is at the center, and a building is at the back (infinity) sufficiently away from the person. For example, the person as a focused subject is 2.5 m ahead of an image acquisition position where the parallax images are shot by using an image pickup apparatus, the building is 300 m ahead, and the images are shot by a lens with a focal length of 50 mm. Minute blocks 401 and 402 are areas used in a computation process in step S312 described later in FIG. 3B. It should be noted that screen transverse positions of target pixels of the minute blocks 401 and 402 of FIG. 4A are the same as screen transverse positions of target pixels of the minute blocks 401 and 402 of FIG. 4B.

Return to FIG. 3A, in step S302, the distance estimation unit 201 of the distance image forming apparatus uses the pair of parallax images read in step S301 to calculate a defocus amount, followed by the program proceeding to step S303.

Figure 3B:
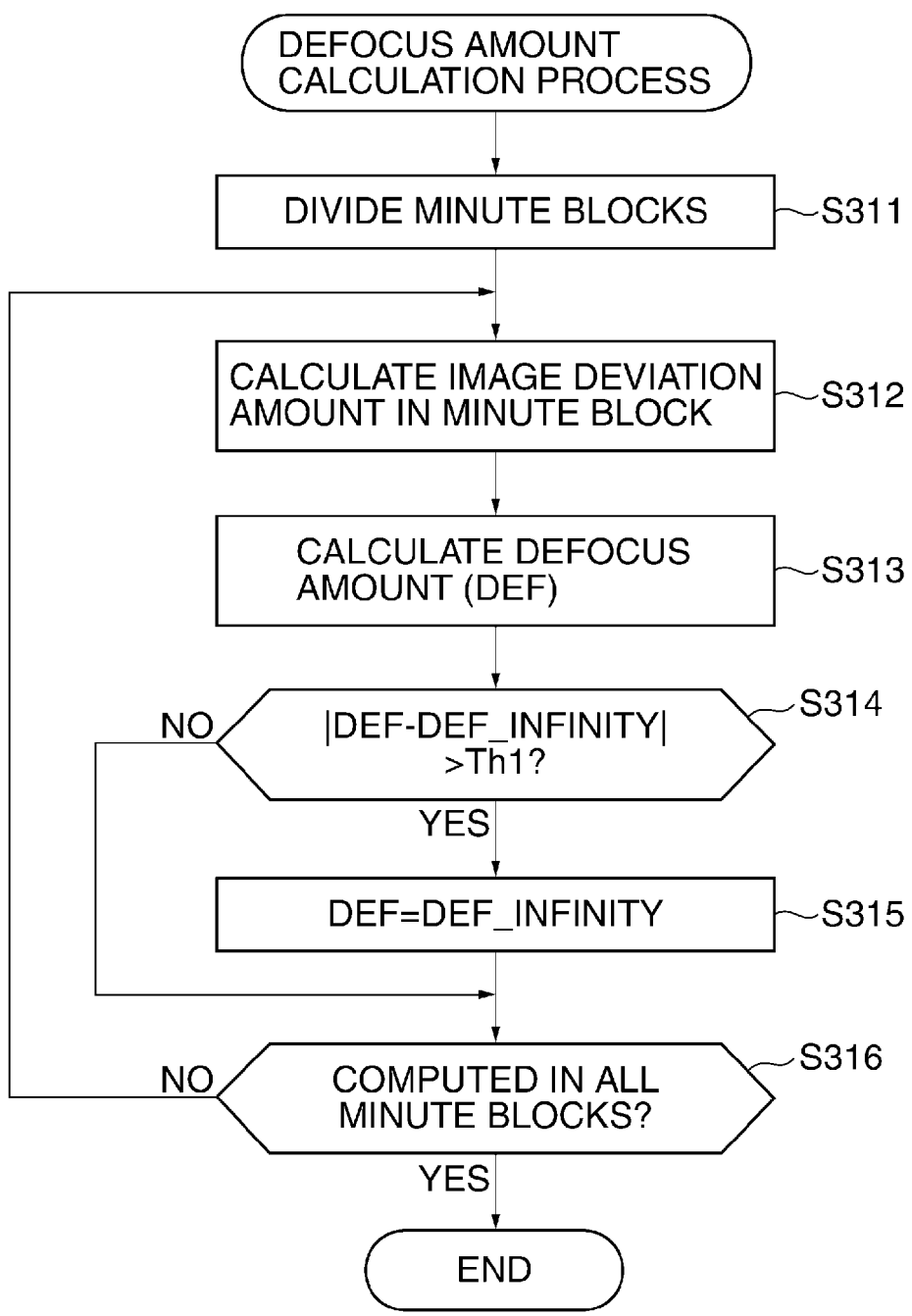
FIG. 3B is a flowchart showing the procedure of a defocus amount calculation process executed in step S302 of FIG. 3A.

FIG. 3B is a flowchart showing the procedure of a defocus amount calculation process executed in step S302 of FIG. 3A.

In step S311, the distance estimation unit 201 divides the pair of parallax images into minute blocks, followed by the program proceeding to step S312. It should be noted that the size and the shape of the divided minute blocks are not particularly limited. Areas of the minute blocks may overlap with areas of adjacent blocks. In the present embodiment, the target pixel at the center of the minute block is set for each pixel included in the input images. It should be noted that the minute block may include one pixel, and in this case, the minute block corresponds to one pixel in the following description.

In step S312, the distance estimation unit 201 executes a correlation degree computation process of the minute blocks divided in step S311 to calculate an image deviation amount, followed by the program proceeding to step S313. Specifically, it is assumed that one of the pair of parallax images read in step S301 is referred to as E, and the other image is referred to as F. It is also assumed that the pair of pixel data corresponding to the divided minute blocks are image data series (E(1) to E(m)) and image data series (F(1) to F(m)), wherein m denotes the number of data. The following Expression (1) is used while relatively moving the image data series (E(1) to E(m)) and the image data series (F(1) to F(m)) to compute a correlation amount (correlation degree) C(k) at a deviation amount k between the two image data series.

$$C(k)=\Sigma|E(n)-F(n+k)| \quad (1)$$

In Expression (1), the operation $\Sigma$ is calculated for n, and the ranges of n and n+k in the operation $\Sigma$ are limited to a range of 1 to m. The deviation amount k is an integer and is a relative shift amount based on detection pitches of the pair of image data.

Figure 5A:
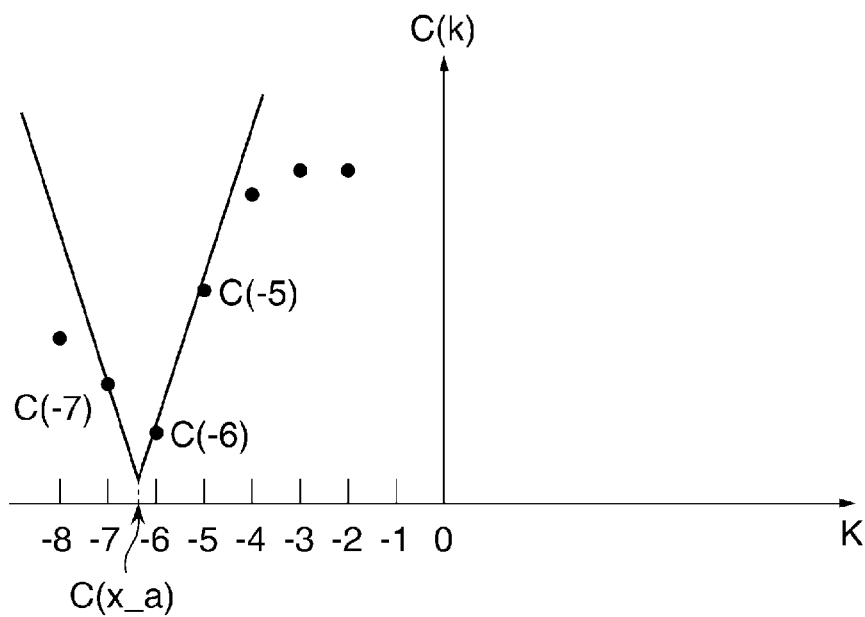
FIGS. 5A and 5B are graphs showing results of computation in minute blocks of a building of FIGS. 4A and 4B, respectively.
Figure 5B:
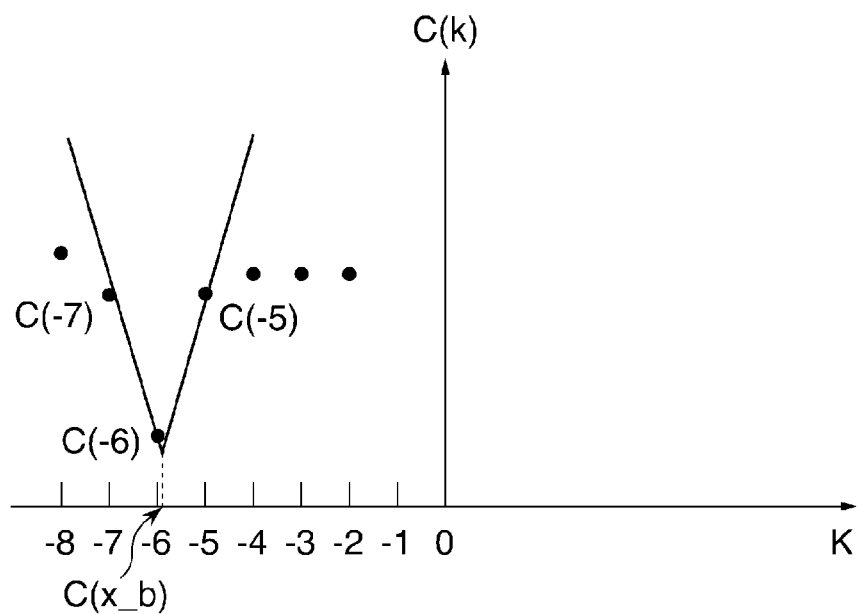

FIG. 5A is a graph showing a result of computation using Expression (1) in the minute block 401 of the building of FIGS. 4A and 4B, and FIG. 5B is a graph showing a result of computation using Expression (1) in the minute block 402 of the building of FIGS. 4A and 4B.

As can be understood from FIGS. 5A and 5B, the correlation amount C(k) is minimum at the shift amount (k=kj=−6) in which the correlation of the pair of image data series is high. Subsequently, a three-point interpolation method is used, and a shift amount x that provides a minimum value C(x) with respect to consecutive correlation amounts can be obtained by the following expression. It should be noted that the unit of the shift amount x is pixel.

$$x = kj + D/SLOP \quad (2)$$

$$D = \{C(kj-1) - C(kj+1)\}/2 \quad (3)$$

$$SLOP = MAX\{C(kj+1) - C(kj), C(kj-1) - C(kj)\} \quad (4)$$

In FIG. 5A, if C(kj)=C(−6)=400, C(kj−1)=C(−7)=1000, and C(kj+1)=C(−5)=4000 hold, then (x_a)=−6.42 holds.

Meanwhile, in FIG. 5B, if C(kj)=C(−6)=400, C(kj−1)=C(−7)=4000, and C(kj+1)=C(−5)=3900 hold, then C(x_b)=−5.99 holds.

In this way, it can be recognized that the ultimate shift amount x through the three-point interpolation method varies at the stage of the correlation amount C(kj), even with the same correlation value and shift amount.

In step S313, the distance estimation unit 201 uses the following Expression (5) to calculate a defocus amount DEF from the shift amount x obtained by using Expression (2) in step S312, followed by the program proceeding to step S314.

$$DEF = P \cdot x \quad (5)$$

In Expression (5), P is a conversion factor determined by the detection pitch (pixel arrangement pitch) and the distance between the projection centers of two left and right viewpoints in the pair of parallax images, and the unit is mm/pixel.

Assuming that P of Expression (5) is 0.166 mm/pixel, a defocus amount DEF_a in the building of FIG. 5A is −1.066 mm, and a defocus amount DEF_b in the building of FIG. 5B is −0.994 mm.

Figure 6:
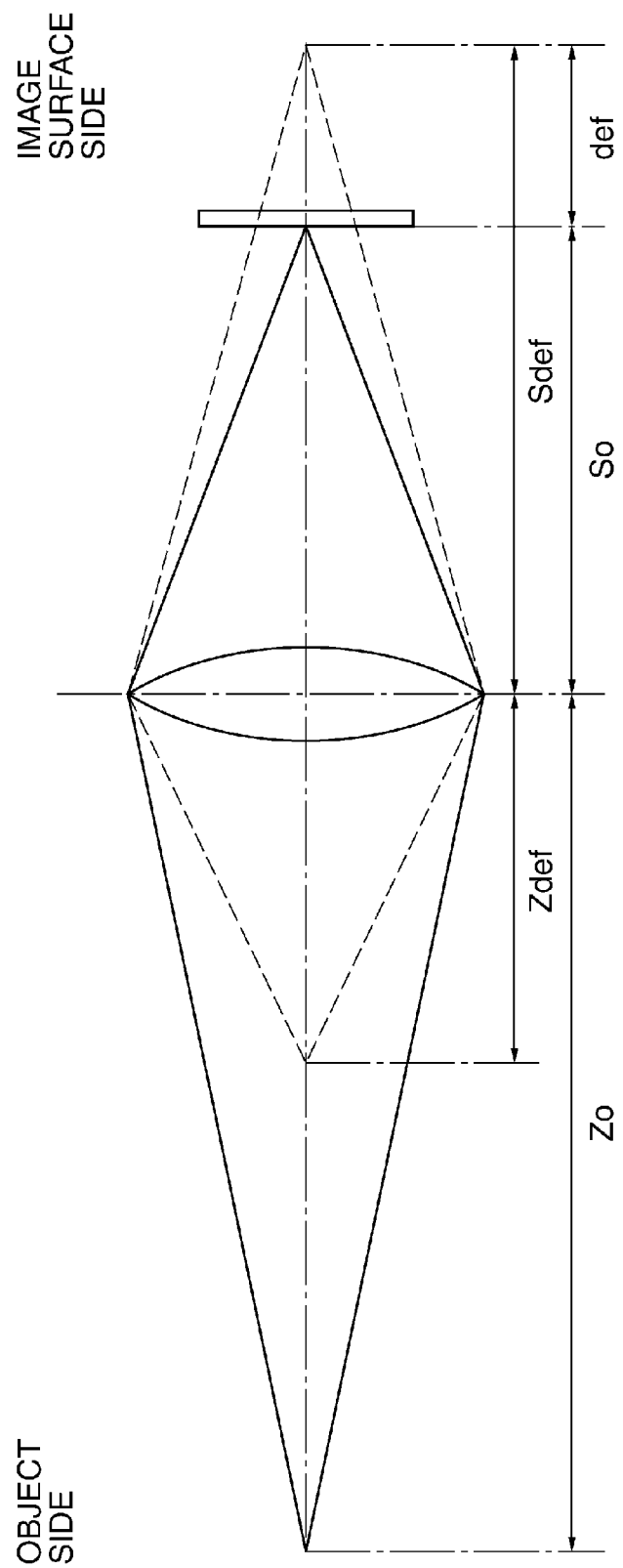
FIG. 6 is a view which is useful in explaining an image formation relationship between a subject side and an image surface side through a lens.

A relationship between the defocus amount and the subject distance will be described with reference to FIG. 6. FIG. 6 is a view which is useful in explaining an image formation relationship between the subject side and the image surface side through the lens.

Assuming that the focal length of the lens is f, the following can be obtained in FIG. 6.

$$1/Zo + 1/So = 1/f \quad (6)$$

$$1/Zdef + 1/(So + def) = 1/f \quad (7)$$

Here, Zo denotes a focused subject side distance, Zdef denotes a defocused subject side distance, So denotes a focused image surface side distance, Sdef denotes a defocused image surface side distance, and def denotes a defocus amount.

The following can be obtained from Expressions (6) and (7).

$$So = (Zo \cdot f)/(Zo - f) \quad (8)$$

$$Sdef = (Zdef \cdot f)/(Zdef - f) \quad (9)$$

$$def = Sdef - So \quad (10)$$

$$Zdef = ((So + def) \cdot f)/((So + def) - f) \quad (11)$$

In the scene of FIG. 4, the values of Expressions (8) and (9) are calculated to obtain So=51.02 mm and Sdef=50.008 mm.

In Expression (11), a value of a defocus amount DEF_INFINITY of the infinity where ((So+def)−f)≅0 is DEF_INFINITY=−1.020 mm.

It can be recognized that when a value smaller than DEF_INFINITY is input in Expression (11), Zdef is a negative subject distance. There is actually no subject imaged on such a surface, and the calculation of such a defocus amount is caused by an error during the correlation computation. In the following description, the defocus amount in which Zdef is a negative value will be referred to as a defocus amount of ultrainfinity. In the present embodiment, the defocus amount can be corrected when the defocus amount of ultrainfinity is calculated.

Return to FIG. 3B, in step S314, the distance estimation unit 201 determines whether a difference absolute value between the defocus amount calculated in step S313 and the defocus amount of infinity DEF_INFINITY exceeds a preset threshold Th1. If the difference absolute value exceeds the threshold Th1 (YES to S314), the program proceeds to step S315, whereas if not, the program proceeds to step S316.

In step S315, the distance estimation unit 201 replaces the defocus amount calculated in step S313 with the defocus amount of infinity, followed by the program proceeding to step S316. It is, therefore, possible to correct the defocus amount of ultrainfinity generated by the three-point interpolation method.

In the present embodiment, the threshold Th1 is 0.03. Therefore, DEF_a−1.066 mm, which is a defocus amount of ultrainfinity, is replaced with the defocus amount of infinity DEF_INFINITY, which provides −1.020 mm. Meanwhile, DEF_b remains at −0.994 mm. It should be noted that it is desirable to change the value of the threshold Th1 according to the size of P in Expression (5) representing the resolving power of the defocus amount.

In step S316, the distance estimation unit 201 determines whether the process of steps S312 to S315 is executed for all minute blocks. If the process is executed for all minute blocks, the distance estimation unit 201 ends the process. If the process is not executed for all minute blocks, the distance estimation unit 201 returns to step S312 to repeat the calculation process of the defocus amount.

In step S303 of FIG. 3A, the distance reliability calculation unit 202 of the distance image forming apparatus calculates the reliability of the defocus amount (estimated distance) calculated in step S302 for each minute block, followed by the program proceeding to step S304.

The reliability is determined by whether the difference value between the defocus amount calculated in step S302 and the defocus amount of infinity DEF_INFINITY is smaller than a preset threshold Th2 (threshold Th1>threshold Th2). If the difference value is smaller than the threshold Th2, it is determined that the defocus amount is a defocus amount of ultrainfinity, and a low reliability is allocated to the minute block.

The allocation of a low reliability may be consecutive numerical values that are set according to the difference value between the defocus amount calculated in step S302 and the defocus amount of infinity DEF_INFINITY or may be a flag, such as a sign and a symbol, simply indicating that the reliability of the estimated distance is low. For example, "1" may be allocated to a block in which the difference value is smaller than the threshold Th2, and "0" indicating a high reliability may be allocated to other blocks. It should be noted that when consecutive values are used for the reliability, the level of the reliability can be indicated by comparison with a predetermined value that is a value when the difference value is equal to the threshold Th2.

Figure 7:
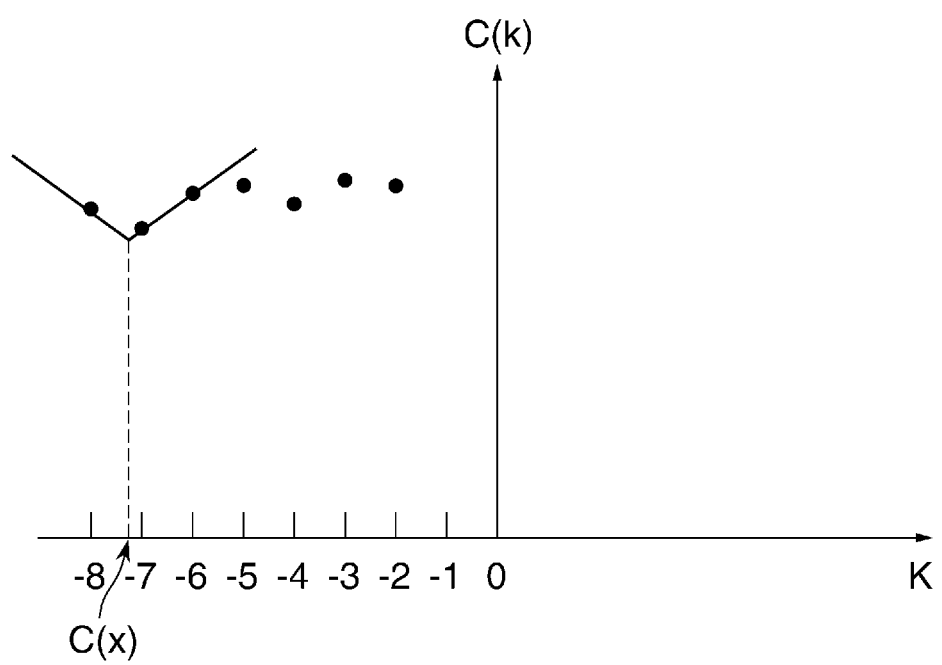
FIG. 7 is a graph which is useful in explaining a result of a correlation computation process with a small correlation amount.

The reason why the defocus amount is determined to be a defocus amount of ultrainfinity can be that the correlation amount of the pair of image data series is small and that the detected minimum value C(x) is a local minimum value exceeding the infinity as shown in FIG. 7. For example, such a defocus amount tends to be detected at a part without a change in the luminance, such as the sky, and at a part with high luminance, such as the sun. In the present embodiment, a low reliability is allocated to the defocus amount of ultrainfinity detected in these subjects, and the estimated distance correction unit 203 corrects the defocus amount later.

The reason that two thresholds, the threshold Th2 of step S303 and the threshold Th1 of step S314, are used is as follows. The case in which the value is rounded at ultrainfinity by the three-point interpolation method, although the correlation amount of the pair of image data series is large near the infinity (FIGS. 5A and 5B) can be distinguished from the case in which the value is at ultrainfinity because the correlation amount of the pair of image data series is small (FIG. 7).

In step S304, the estimated distance correction unit 203 of the distance image forming apparatus uses the reliability calculated in step S303 to correct the defocus amount (estimated distance) calculated in step S302, followed by the program proceeding to step S305. A well-known technique (for example, Japanese Laid-Open Patent Publication (Kokai) No. 2008-15754) is used as the correction method here.

Specifically, a minute block with a low reliability is replaced with a distance value of a minute block with a high similarity and a high reliability of estimated distance among surrounding minute blocks based on similarities of image characteristics to the surrounding minute blocks. The image characteristics include luminance information, hue information, saturation information, contrast information, and the like. It should be noted that the correction method of distance is not limited to the replacement of the distance value, and distance values of a plurality of surrounding minute blocks with high degrees of similarity may be acquired to use the average value of the distance values.

In step S305, the actual distance image forming unit 204 of the distance image forming apparatus converts the estimated distance corrected in step S304 into an actual distance image, followed by the program terminating. In the conversion method here, Expression (11) is used for each minute block to convert the corrected estimated distance into the subject distance. The estimated distance converted in this case does not include a value smaller than the defocus amount of infinity DEF_INFINITY, and it can be recognized that the subject distance in which Zdef is a negative value is not calculated. The distance image here may be a monochrome image in which the gray scale changes according to the subject distance, may be a color image in which the tone changes according to the subject distance, or may be a tabular image expressing the subject distance by a numerical value.

As described, the defocus amount is corrected in the present embodiment when the value is rounded at ultrainfinity by the three-point interpolation method based on a pair of parallax images or images with different focusing positions or when the value is at ultrainfinity due to a small correlation amount of a pair of image data series. The corrected defocus amount is converted into the subject distance. In this way, the reliability for correction is calculated from a pair of images, and an error in the estimated distance during the correlation computation can be corrected to form a highly accurate distance image without holding in advance the data for correcting the distance information in a recording medium, such as a ROM.

It should be noted that the present invention is not limited to the one illustrated in the embodiment and that changes can be appropriately made without departing from the scope of the present invention.

For example, although the defocus amount that is the estimated distance is corrected first to convert the defocus amount into the subject distance in the embodiment, the defocus amount may be converted to the subject distance first to modify the part with a negative distance into the distance of infinity.

A well-known subject recognition technique may be utilized to set both of the thresholds Th1 and Th2 to the defocus amount of infinity (DEF_INFINITY) in a minute block including an area with a subject at a specific luminance, such as the sun and the sky, or a low reliability may be allocated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086318, filed Apr. 18, 2014 which is hereby incorporated by reference herein in its entirety.

What is claimed is:

1. An image processing apparatus comprising:
a processor processing input data of a plurality of images, the processor performing the functions of:
a distance estimation unit configured to estimate distance information corresponding to a subject distance in each area of the plurality of images, from a correlation degree of the plurality of images;
a distance reliability calculation unit configured to calculate a reliability of the distance information estimated by the distance estimation unit; and a distance image forming unit configured to correct the distance information estimated by the distance estimation unit based on the reliability calculated by the distance reliability calculation unit and to form a distance image based on the corrected distance information, wherein the distance image includes a monochrome image which changes in gray scale according to the estimated distance information or a color image which changes in tone according to the estimated distance information.

2. The image processing apparatus as claimed in claim 1, wherein the plurality of images are a pair of images with parallax or a pair of images with different focusing positions.

3. The image processing apparatus as claimed in claim 1, wherein the distance estimation unit determines whether to replace the calculated distance information with distance information of infinity based on a first threshold that is set in advance.

4. The image processing apparatus as claimed in claim 3, wherein the distance reliability calculation unit determines whether the distance information estimated by the distance estimation unit is distance information exceeding infinity based on a second threshold that is set in advance and allocates a low reliability if the distance reliability calculation unit determines that the distance information exceeds infinity.

5. The image processing apparatus as claimed in claim 1, wherein the distance image forming unit is configured to use the reliability calculated by the distance reliability calculation unit and to perform a correction of replacing the distance information of an area with low reliability with the estimated distance information of an area with a high reliability among areas around the area with low reliability.

6. The image processing apparatus as claimed in claim 1, wherein the distance image forming unit uses the reliability calculated by the distance reliability calculation unit and performs a correction of replacing a value of the distance information of an area with low reliability with an average value of the estimated distance information of a plurality of areas with high reliabilities around the area with low reliability.

7. The image processing apparatus as claimed in claim 4, wherein the processor further functions as a subject recognition unit configured to set the first threshold and the second threshold to the distance information of infinity in an area including a subject with a specific luminance recognized by the subject recognition unit.

8. The image processing apparatus as claimed in claim 7, wherein the distance reliability calculation unit is configured to allocate a low reliability to the area including the subject with the specific luminance recognized by the subject recognition unit.

9. The image processing apparatus as claimed in claim 1, further comprising an input unit configured to input the plurality of images to the distance estimation unit.

10. The image processing apparatus as claimed in claim 9, wherein the input unit is an image pickup unit configured to pick up an image of a subject.

11. A control method of an image processing apparatus comprising a processor processing input data of a plurality of images, the control method being performed by the processor and comprising:

a distance estimation step of estimating distance information corresponding to a subject distance in each area of a plurality of images from a correlation degree of the plurality of images;

a distance reliability calculation step of calculating a reliability of the distance information estimated at the distance estimation step; and a distance image forming step of correcting the distance information estimated at the distance estimation step based on the reliability calculated by the distance reliability calculation step and forming a distance image based on the corrected distance information, wherein the distance image includes a monochrome image which changes in gray scale according to the estimated distance information or a color image which changes in tone according to the estimated distance information.

12. A non-transitory computer-readable storage medium storing a program causing a computer to implement a control method of an image processing apparatus, comprising a processor processing input data of a plurality of images, the control method being performed by the processor and, the control method comprising:

a distance estimation step of estimating distance information corresponding to a subject distance in each area of a plurality of images, from a correlation degree of the plurality of images;

a distance reliability calculation step of calculating a reliability of the distance information estimated at the distance estimation step; and a distance image forming step of correcting the distance information estimated at the distance estimation step based on the reliability calculated by the distance reliability calculation step and forming a distance image based on the corrected distance information, wherein the distance image includes a monochrome image which changes in gray scale according to the estimated distance information or a color image which changes in tone according to the estimated distance information.

13. An image processing apparatus comprising:

a processor processing input data of a plurality of images, performing the functions of:

a distance estimation unit configured to estimate distance information corresponding to a subject distance in each image area of the plurality of images from a correlation degree of the plurality of images;

a distance reliability calculation unit configured to calculate a reliability of the distance information estimated by the distance estimation unit, by comparing the estimated distance information and distance information corresponding to a specified subject distance; and a distance image forming unit configured to correct the distance information estimated by the distance estimation unit based on the reliability calculated by the distance reliability calculation unit and to form a distance image based on the estimated distance information and the corrected distance information.

14. The image processing apparatus as claimed in claim 13, wherein the plurality of images are a pair of images with parallax or a pair of images with different focusing positions.

15. The image processing apparatus as claimed in claim 13, wherein the distance estimation unit determines whether to replace the calculated distance information with distance information of infinity based on a first threshold that is set in advance.

16. The image processing apparatus as claimed in claim 15, wherein the distance reliability calculation unit determines whether the distance information calculated by the distance estimation unit is distance information exceeding infinity based on a second threshold that is set in advance and to allocate a low reliability if the distance reliability calculation unit determines that the distance information exceeds infinity.

17. The image processing apparatus as claimed in claim 13, wherein the distance image forming unit is configured to use the reliability calculated by the distance reliability calculation unit and to perform a correction of replacing the distance information of the image area with low reliability with the estimated distance information of the image area with a high reliability among areas around the area with low reliability.

18. The image processing apparatus as claimed in claim 13, wherein the distance image forming unit uses the reliability calculated by the distance reliability calculation unit and performs a correction of replacing a value of the subject distance of the image area with low reliability with an average value of the estimated subject distances of a plurality of the image areas with high reliabilities around the area with low reliability.

19. The image processing apparatus as claimed in claim 1, wherein the distance information estimated by the distance estimation unit indicates a defocus amount.

20. The image processing apparatus as claimed in claim 13, wherein the distance information estimated by the distance estimation unit indicates a defocus amount.

21. The image processing apparatus as claimed in claim 13, wherein the specified subject distance indicates a subject distance of infinity.

22. An image processing apparatus comprising:
a processor processing input data of a plurality of images, the processor performing the functions of:
a distance estimation unit configured to estimate distance information corresponding to a subject distance in each image area of the plurality of images from a correlation degree of the plurality of images;
a correcting unit configured to correct distance information corresponding to a subject distance which exceeds a specified subject distance to correspond to the specified subject distance; and
a distance data array forming unit configured to form a distance data array based on the estimated distance information and the corrected distance information.

23. The image processing apparatus as claimed in claim 22, wherein the plurality of images are a pair of images with parallax or a pair of images with different focusing positions.

24. The image processing apparatus as claimed in claim 22, wherein the distance information estimated by the distance estimation unit indicates a defocus amount.

25. A control method of an image processing apparatus comprising a processor processing input data of a plurality of images, the control method being performed by the processor and comprising:
a distance estimation step of estimating distance information corresponding to a subject distance in each image area of the plurality of images from a correlation degree of the plurality of images;
a distance reliability calculation step of calculating a reliability of the distance information estimated by the distance estimation step by comparing the estimated distance information and distance information corresponding to a specified subject distance; and
a distance image forming step of correcting the distance information estimated by the distance estimation step based on the calculated reliability calculated by the distance reliability calculation step and forming a distance image based on the estimated distance information and the corrected distance information.

26. A control method of an image processing apparatus comprising a processor processing input data of a plurality of images, the control method being performed by the processor and comprising:
a distance estimation step of estimating distance information corresponding to a subject distance in each image area of the plurality of images from a correlation degree of the plurality of images; and
a distance image forming step of correcting distance information corresponding to a subject distance which exceeds a specified subject distance to correspond to the specified subject distance; and
a distance array forming step of forming a distance data array based on the estimated distance information and the corrected distance information.

* * * * *